No. 831,816. PATENTED SEPT. 25, 1906.
W. WILSON.
BEARING STUD.
APPLICATION FILED MAR. 17, 1906.

Witnesses
Edward S. Day
Alfred H. Hildreth

Inventor
William Wilson
by his Attorneys
Phillipp Van Everen Fish

UNITED STATES PATENT OFFICE.

WILLIAM WILSON, OF BOSTON, MASSACHUSETTS, ASSIGNOR TO CAMPBELL BOSWORTH MACHINERY COMPANY, OF PORTLAND, MAINE, A CORPORATION OF MAINE.

BEARING-STUD.

No. 831,816.     Specification of Letters Patent.     Patented Sept. 25, 1906.

Application filed March 17, 1906. Serial No. 306,550.

*To all whom it may concern:*

Be it known that I, WILLIAM WILSON, a citizen of the United States, residing at Boston, in the county of Suffolk and State of Massachusetts, have invented certain new and useful Improvements in Bearing-Studs; and I do hereby declare the following to be a full, clear, and exact description of the invention, such as will enable others skilled in the art to which it appertains to make and use the same.

This invention relates to improvements in bearing-studs for machinery.

The object of the invention is to produce an improved bearing-stud for use in connection with cam-rolls, links, and the like in machinery in which the bearing-surface may be renewed when worn and in which the length of the stud and its projection beyond the member journaled thereon is reduced as far as possible in order to save space in the machine in which the stud is used.

The invention consists in the improved bearing-stud hereinafter described, and defined in the claims.

Figure 1:
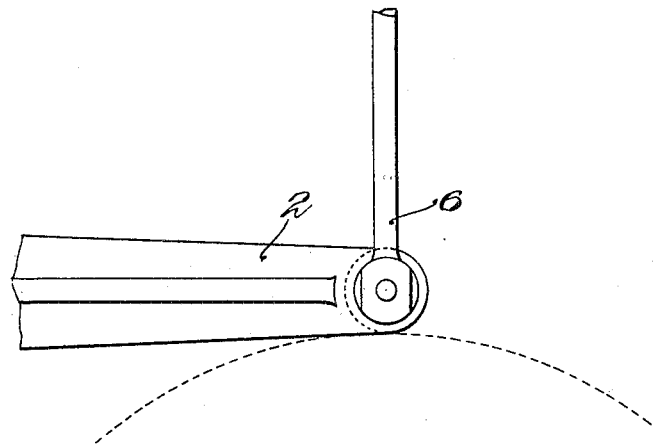
Figure 2:
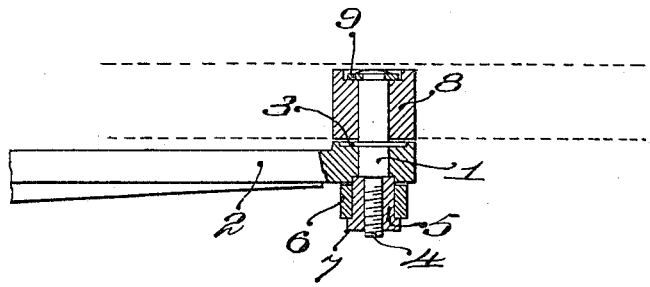

In the drawings, Figure 1 is an end elevation of the stud and the portions of a machine in connection with which it is used, and Fig. 2 is a horizontal section through the stud and the parts connected thereby.

The illustrated embodiment of the invention is a bearing-stud fixed in the end of a cam-lever and providing at one end a bearing for the cam-roll and at the other end a bearing for a link connected with and actuated by the cam-lever.

The stud comprises a shank 1, fitted in an opening of the cam-lever 2 and provided with a thin head 3. The shank 1 is provided with a threaded extremity 4, projecting from the side of the cam-lever, and upon this threaded extremity is screwed a bushing 5, which serves not only as a nut to secure the stud in the lever, but also as a bearing for the link 6, journaled thereon. The bushing 5 has a flange 7, forming a shoulder to retain the link 6 on the stud, and the flange is flattened, as shown in Fig. 1, for convenience in screwing the bushing into place. By this arrangement the stud is securely fixed in place and prevented from working loose, while it projects very slightly beyond the end of the link 6. When the bushing is worn, it may be removed and a new bushing screwed in its place.

The shank of the stud is extended beyond the head 3, so as to provide a bearing for a cam-roll 8, and is provided with a washer 9, riveted in place on the end of the stud to retain the cam-roll on the stud.

The portion of the stud comprising the threaded bushing, although used in the illustrated embodiment to provide a journal for a link, is not limited to such use, but may be used as a journal for cam-rolls, wheels, or other rotary or oscillating members of a machine, and although the illustrated embodiment of the invention provides bearings for both a link and a cam-roll the invention is not limited to this construction, which is adopted merely as a matter of convenience in the machine for use in connection with which the stud is particularly adapted.

Having now described the invention, what is claimed is—

1. A bearing-stud having, in combination, a shank provided with a projecting threaded portion, and a bearing-bushing of greater diameter than the shank screwed on the threaded portion and provided with a shoulder to retain the member journaled on the bushing and a shoulder to engage the part in which the shank is mounted to secure the shank in place, substantially as described.

2. A bearing-stud having, in combination, a shank provided with a head and a screw-threaded projecting portion, and a nut screwed on the shank to secure the stud in place, and having a cylindrical portion forming a bearing for a member journaled thereon, substantially as described.

3. A bearing-stud having, in combination, a shank, a flange intermediate the ends thereof, a journal for a roll on one end of the shank, a screw-threaded portion on the other end of the shank, and a bearing-bushing screwed on the threaded portion and provided with a shoulder to retain the member journaled on the bushing, substantially as described.

In testimony whereof I affix my signature in presence of two witnesses.

WILLIAM WILSON.

Witnesses:
    HORACE VAN EVEREN,
    FRED O. FISH.